(12) United States Patent
Stanczak

(10) Patent No.: US 7,607,387 B2
(45) Date of Patent: Oct. 27, 2009

(54) SYSTEM AND METHOD FOR DIVERTING LIQUIDS FROM FOODSTUFF DURING PREPARATION IN A FRYING PAN

(76) Inventor: Edmund A. Stanczak, 24708 Princeton, Saint Clair Shores, MI (US) 48080

( * ) Notice: Subject to any disclaimer, the term of this patent is extended or adjusted under 35 U.S.C. 154(b) by 0 days.

(21) Appl. No.: 11/780,321

(22) Filed: Jul. 19, 2007

(65) Prior Publication Data

US 2008/0017047 A1 Jan. 24, 2008

Related U.S. Application Data

(60) Provisional application No. 60/831,815, filed on Jul. 19, 2006.

(51) Int. Cl.
 A47J 37/10 (2006.01)
 A47G 23/02 (2006.01)
(52) U.S. Cl. .............. 99/425; 99/422; 99/444; 99/495
(58) Field of Classification Search ........... 99/425, 99/422, 395, 444, 495
 See application file for complete search history.

(56) References Cited

U.S. PATENT DOCUMENTS

| | | | |
|---|---|---|---|
| 1,960 A | 1/1841 | Damon | |
| 284,295 A | 9/1883 | Hailes | |
| 333,894 A | 1/1886 | Simmons et al. | |
| 1,522,329 A * | 1/1925 | Salucci | 220/763 |
| 1,904,925 A | 4/1933 | Perks | |
| 1,974,796 A | 9/1934 | Davis | |
| 2,148,181 A | 2/1939 | Andreolo | |
| 2,327,988 A * | 8/1943 | Bassett | 249/74 |
| 2,611,510 A | 9/1952 | Willits | |
| 2,772,627 A | 12/1956 | Newell | |
| 2,871,848 A * | 2/1959 | Wall et al. | 126/215 |
| 2,903,229 A | 9/1959 | Lange | |
| 3,215,063 A | 11/1965 | Olson et al. | |
| 3,452,895 A | 7/1969 | Kalkowski | |
| 4,140,889 A | 2/1979 | Mason, Jr. et al. | |
| 4,154,218 A | 5/1979 | Hulet | |
| 5,074,777 A * | 12/1991 | Garner | 425/289 |
| 5,315,983 A | 5/1994 | Law | |
| 5,323,693 A | 6/1994 | Collard et al. | |
| 5,850,779 A * | 12/1998 | Zimmerman | 99/425 |
| 5,967,022 A | 10/1999 | Moschella | |
| 5,967,024 A | 10/1999 | DeMars | |
| 6,182,557 B1 | 2/2001 | Wilk | |
| 6,844,529 B2 * | 1/2005 | Grohs | 219/450.1 |

* cited by examiner

Primary Examiner—Reginald L Alexander
(74) Attorney, Agent, or Firm—Shook, Hardy & Bacon LLP

(57) ABSTRACT

A system for directing cooking liquids away from cooking foodstuff in a frying pan is disclosed. The system includes a frying pan supporting structure and a shield. The frying pan supporting structure includes a bottom side for placement on a heating element and a top side upon which said frying pan rests. The bottom side and the top side are angled with respect to each other. The liquid, typically in the form of oil or grease in flowing form, substantially collects under the shield which prevents the splattering and splashing of oil and hot grease on the user.

19 Claims, 4 Drawing Sheets

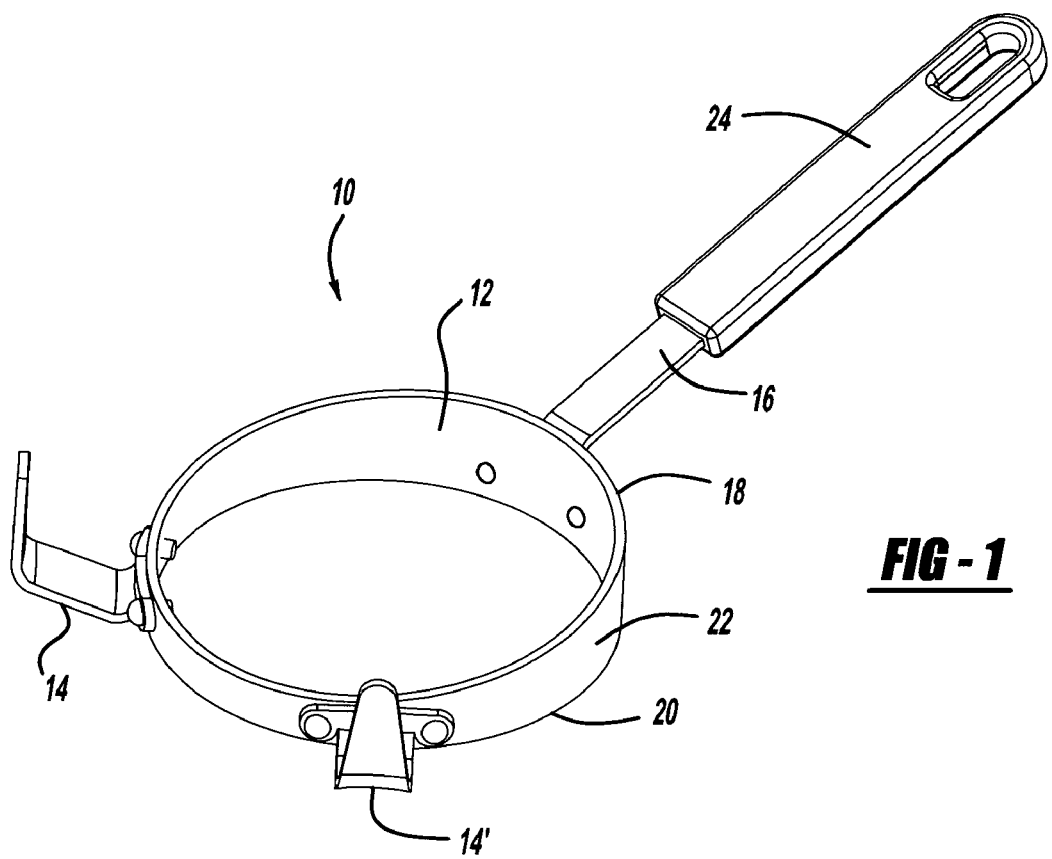
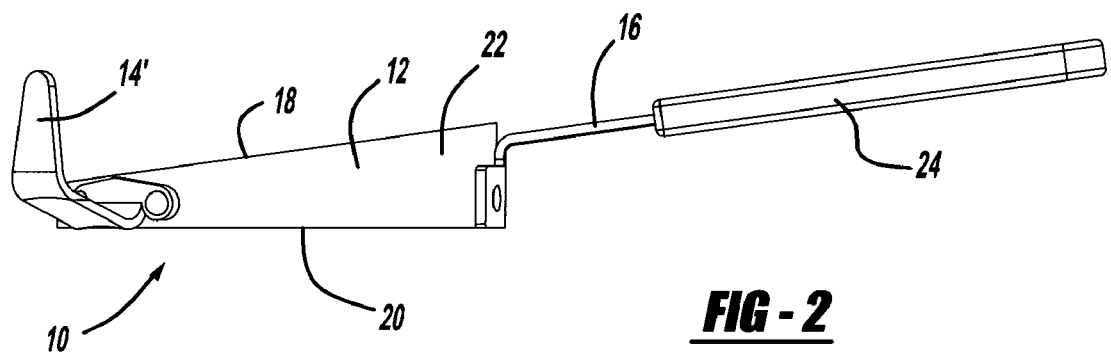

SYSTEM AND METHOD FOR DIVERTING LIQUIDS FROM FOODSTUFF DURING PREPARATION IN A FRYING PAN

TECHNICAL FIELD

The disclosed invention relates generally to a system and method for diverting cooking liquids, generally in the form of oil and flowing grease, from foodstuff during preparation in a frying pan. More particularly, the disclosed invention relates to an angled supporting structure for placement on a heating surface for supporting a frying pan and to a shield that restricts both splattering and splashing for placement in the frying pan.

BACKGROUND OF THE INVENTION

It is well known that too much oil and fat in the diet is unhealthy. It is also well known that much of the oil and fat in the diet is the result of consuming foodstuff, such as hamburger meat, fried in a frying pan. In general cooking oil is placed on the frying pan. During the denaturing process involved in cooking meat it is normal for grease to be released. The combined residual cooking oil and grease tend to well in the bottom of the flat pan. The oil and grease is then taken up with the foodstuff when it is removed from the pan.

In an effort to control the amount of oil and fat in the diet, makers of cooking utensils have provided a variety of approaches to reducing the amount of oil and fat actually residual on the foodstuff. Today's cook has dealt with the problem of excess oil and grease in the pan using a variety of conventional methods. Paper towels, for example, have been used to absorb the oil and grease. It is also common for cooks to loosely place the pan cover over the frying pan followed by tilting of the cover-pan combination to allow excess oil and grease to drain away. Pasta colanders have been used for draining the oil and grease and metal racks have also been used to allow the oil and grease of the foodstuff to drain off. Some cooks have gone so far as to refrigerate the cooked foodstuff to harden the grease, which is then removed.

As an alternative to these approaches, utensils specifically designed for dealing with the issue of excess oil and grease have been devised. One popular utensil is the cooking grill which allows the oil and fat to run off of the material being cooked. However, the grill surface is difficult to clean and requires additional care in both manufacturing and in handling. Other utensils are directed to providing an angled surface at the bottom of a fryer in order to effect movement of the oil and grease away from the foodstuff. However, these devices, while providing some improvement in the field, are limited in their broad application because of inconvenience in use, high cost of manufacture, or general bulkiness.

Accordingly, as in so many areas of technology, there is room for advancement in the art of cooking utensils.

SUMMARY OF THE INVENTION

The disclosed invention provides a system and a method of using the system for directing liquids, particularly oils and grease in flowing form, away from foodstuff cooking in a frying pan. Specifically, the system converts existing horizontal frying pans into angled frying pans. The system includes a frying pan supporting structure and a shield that prevents both splashing and splattering of oil and hot grease onto the user. The frying pan supporting structure includes a bottom side for placement on a heating element and a top side upon which said frying pan rests. The bottom side and the top side are angled with respect to each other. The degree of angle can be of a variety of values, but in general the degree should be between about 3° and 8°.

The frying pan supporting structure, which is preferably a ring structure but which could be shaped otherwise, includes a pair of spaced apart arms for retaining the angled frying pan thereby preventing it from sliding off of the top of the supporting structure. The frying pan supporting structure further includes a handle for manipulating the device. The oil or grease in flowing form substantially collects under the shield which prevents splashing and splattering. The shield may be made of a variety of configurations, but generally is a substantially flat sheet of a half-moon configuration and an element to retain the shield on the frying pan, such as a hook. The shield may be fitted with a wall. The user positions the shield at the low end of the angled frying pan. During use the oil and grease escaping from the foodstuff is directed by gravity to the lowest end of the frying pan, which is that area substantially under the shield.

The system of the disclosed invention provides a broad variety of advantages over prior approaches to dealing with excessive oil and grease resulting from cooking. The approach of the instant invention provides for straight-forward mechanical separation of most of the oil and grease from around the foodstuff while leaving adequate pan surface area for proper cooking. The disclosed invention accomplishes this using a conventional frying pan, which can be of a great variety of sizes, shapes and depths. The supporting structure is configured in general as a ring so as to fit upon virtually any standard cooking surface, including electric coils, flat surfaced radiant glass stovetops, and gas models. Because of the provision of a pair of spaced apart arms fitted to the ring, movement of the frying pan on top of the supporting structure is highly restricted. This can be accomplished without the need of securing the frying pan to the supporting structure, thereby allowing the cook to readily move between horizontal cooking to angled cooking. Accordingly, the foodstuff can initially be seared horizontally then cooking of the foodstuff can be completed at an angle. This is in sharp contrast to known pans having permanent angled bases as well as to known pans having supporting structures that are fixed to the base of the frying pan.

Because the supporting structure essentially has a hollow center, heat is able to easily and directly radiate from the cooking surface to the bottom of the frying pan and is focused thereby. The supporting structure can also be modified to incorporate ring holes of various sizes, shapes and locations designed to control pan heat distribution. The supporting structure may be made of a variety of materials (preferably stainless steel but also possibly aluminum) which are easily cleaned and durable.

The shield component is installed in the frying pan during cooking and incorporates a barrier that is used to separate the pan into two distinct areas, one for cooking and the other for grease collection. The shield may be left in place when food is turned using a device such as a spatula since it covers only the grease collecting area.

The shield includes a sheet that covers collected grease and a hook that retains the shield in its position relative to the frying pan. This configuration essentially defines a three points of support, including the hook and the outside edges of the shield which are in contact with the frying pan. Placed loosely in position according to its design, the collecting grease is allowed to pass between the shield and the base of the frying pan on its way to the collection area. As an alternative the shield may have a plurality of notches defined therein to allow the grease to pass. Regardless of its configuration, the shield is preferably composed of a thin gauge material having a high surface-to-weight surface to weight ratio thus reducing potential for burns to cooks as well as damage to countertops. The shield may include a handle for use by the cook or may alternatively include a notch or slot into which a utensil such as a fork may be inserted for removal of the shield. The shield preferably provides a hook which can be grasped by the user with a heating pad for removal of the shield from the frying pan.

In addition to covering collected grease and thereby preventing this grease from both splashing when the pan is handled and from splattering during cooking, the shield separates the pan into two distinct areas, one being for cooking and the other being for grease collection. The shield also prevents the foodstuff from moving from its cooking area to the grease collection area during cooking. The shield fits a broad variety of pans having different side heights, side flares and side corner radii.

Other advantages and features of the embodiments of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 1 is a perspective view of the frying pan supporting structure according to the disclosed invention;

FIG. 2 is a side view of the frying pan supporting structure of FIG. 1;

DETAILED DESCRIPTION OF THE PREFERRED EMBODIMENT

Figure 3:
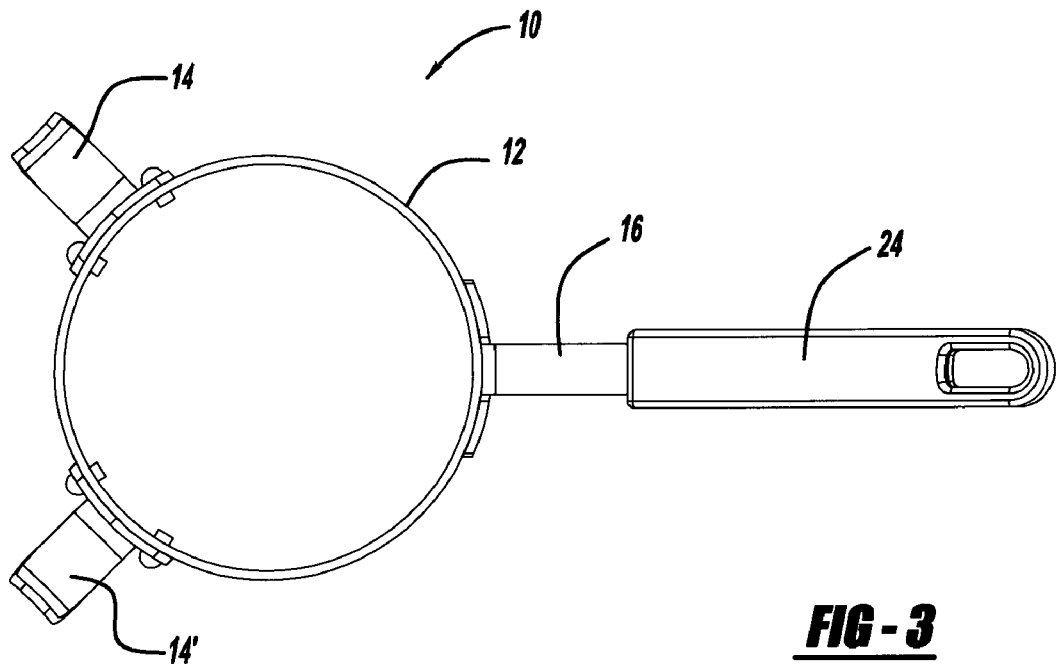
FIG. 3 is a top plan view of the frying pan supporting structure of FIGS. 1 and 2.

In the following figures, the same reference numerals will be used to refer to the same components. In the following description, various operating parameters and components are described for one constructed embodiment. These specific parameters and components are included as examples and are not meant to be limiting.

With reference to FIGS. 1, 2 and 3, a perspective and a side view of a frying pan supporting structure, generally illustrated as 10, a side view of the frying pan supporting structure 10, and a top plan view of the frying pan supporting structure are respectively shown. The frying pan supporting structure 10 includes a body 12, a pair of frying pan supporting arms 14 and 14', and a handle 16.

The body 12 is illustrated as having a ring configuration as such a configuration may be the most desirable. However, it is to be understood that other configurations, such as a square, rectangular, triangular, octagonal, or other shape may be used as well. Regardless of the shape, the body 12 is composed of an easy to clean and durable metal material, such as stainless steel or aluminum.

The body 12 includes a top, frying pan-supporting side 18, and a bottom, heating element-contacting side 20. A wall 22 is formed between the top side 18 and the bottom side 20. The height of the wall 22 is greater at one end of the body 12 than at the other end. This difference in height defines the planar structure of the body 12. The angle between the top side 18 and the bottom side 20 may be any of a variety of angles, but the angle must at least be great enough to cause a flow of oil and grease from the higher end of the frying pan (not shown) where the foodstuff is being prepared to the lower end of the frying pan, where the oil and grease are being gathered. The angle, however, must not be great enough so that the foodstuff itself moves toward the lower end of the frying pan and must not be so shallow that the grease puddle becomes excessively wide. The preferred angle is between about 3° and 8°.

The arms 14 and 14' satisfy the need to provide a structure which will prevent the angled frying pan from sliding or otherwise moving along the top side 18 of the body 12. While two arms are shown, one may be satisfactory if it is wide enough at its pan-contacting location to halt the movement of the frying pan. Of course, more than two arms may be suitable as well. The arms 14 and 14' are fixed to the body 12 by mechanical fastening such as by screws or rivets. In addition or alternatively, the arms 14 and 14' may be fixed to the body 12 by welding or may be integrated into the body 12 as part of the manufacturing process.

The handle 16 is provided to facilitate movement by the user of the frying pan supporting structure 10. The handle 16 as illustrated is exemplary and other handle configurations may be used. As is known the handle 16 may or may not include an insulating portion 24 that is held by the user. The handle 16 is fixed to the body 12 by mechanical fastening such as by screws or rivets. It may be fastened to the body 12 by welding.

Figure 4:
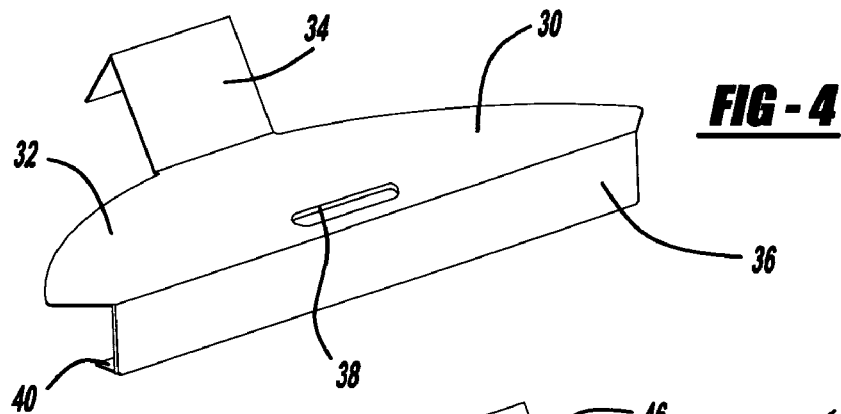
FIG. 4 is a perspective view of a first configuration of the shield of the present invention.

The user of the disclosed invention will likely find it desirable to minimize splashing or splattering of the hot oil or grease. To provide against the splashing or splattering of grease a shield 30 is provided for placement at one end of the frying pan, as illustrated in FIG. 4 which shows a perspective view of the shield 30. The shield 30 includes a planar, half-moon shaped body 32 having a hook 34 for positioning the shield 30 on the peripheral wall of the frying pan. The configuration of the hook 34 may be altered as need to provide for frying pans having peripheral walls of different heights. A greater number of hooks may also be used.

An optional substantially vertical wall 36 is provided integral with the substantially planar body 32. The vertical wall 36 is provided with a lower edge which rests upon the base of the frying pan. A slot 38 may optionally be formed in the planar body 32. The user may use the slot to insert a fork or other utensil as needed to remove the shield 30 from the frying pan. Adjacent the slot 38 is an optional flange 40 which runs along all or most of the length of the lower edge of the vertical wall 36. The flange 40 is desirable when the shield 30 is used in frying pans having a non-stick surface to thereby prevent scratching of the surface. However, a shield having the flange 40 could as well be used on conventional frying pans having no non-stick surface.

Figure 5:
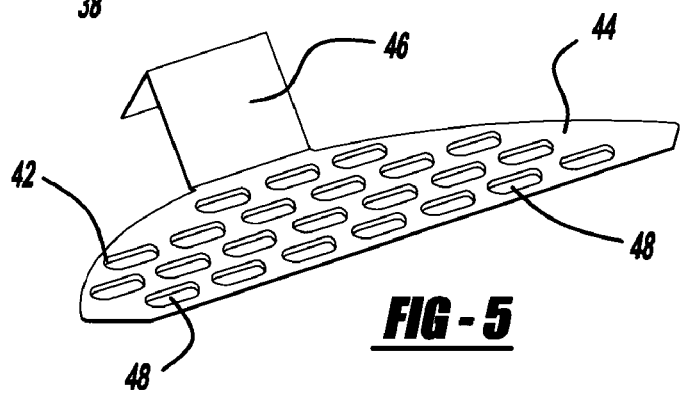
FIG. 5 is a perspective view of a second configuration of the shield of the present invention.

An alternate configuration of a spatter shield is shown in FIG. 5 in which a shield 42 includes a planar, half-moon shaped body 44. Extending from the body 44 is a hook 46 for attachment to the frying pan.

The Unlike the body 32 of the shield 30 shown in FIG. 4, the body 44 of the shield 42 may be used as an added frying surface. Accordingly, the body 44 has a plurality of slots 48 formed therein to allow the passage of oil and grease but which restricts against the passage of ground meat. The slots 48 also allow for the insertion of a utensil such as a fork to thereby allow the user to remove the shield 42 from the frying pan. It should be noted that the configuration of the slots 48 is exemplary and should not be taken as being limiting as other configurations such as holes may be useable as well, provided the holes are small enough to also restrict the passage of ground meat. The shield 42 also differs from the shield 30 in that there is no parallel structure to the vertical wall 36. Instead, the straight edge of the body 44 rests directly on the base of the frying pan when in use.

Figure 6:
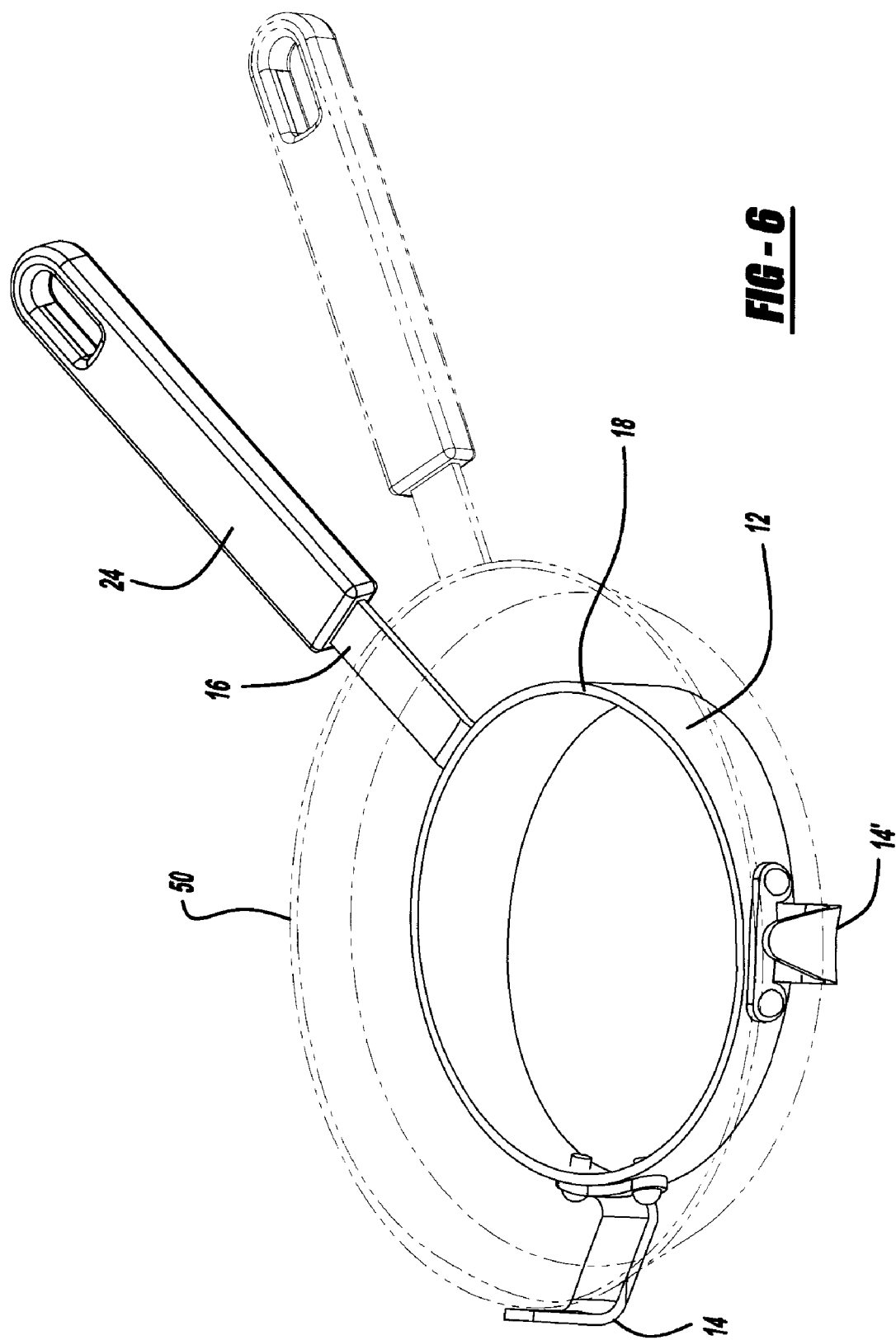
FIG. 6 is a perspective view of the supporting structure of FIGS. 1 through 3 showing a frying pan (in phantom lines) positioned on the supporting structure.

In use, the cook first places a selected frying pan supporting structure 10 on a heating surface. Next the user places the frying pan on the frying pan supporting structure 10, as illustrated in FIG. 6 in which a perspective view of a frying pan 50 (shown in shadow lines) is illustrated in place on the frying pan supporting structure 10. As illustrated, the arms 14 and 14' abut the outer peripheral wall of the frying pan 50 to maintain its position on the top side 18 of the body 12 of the frying pan supporting structure 10. The underside of the frying pan 50 rests squarely on the top side 18 and provides good contact between the two elements.

Figure 7:
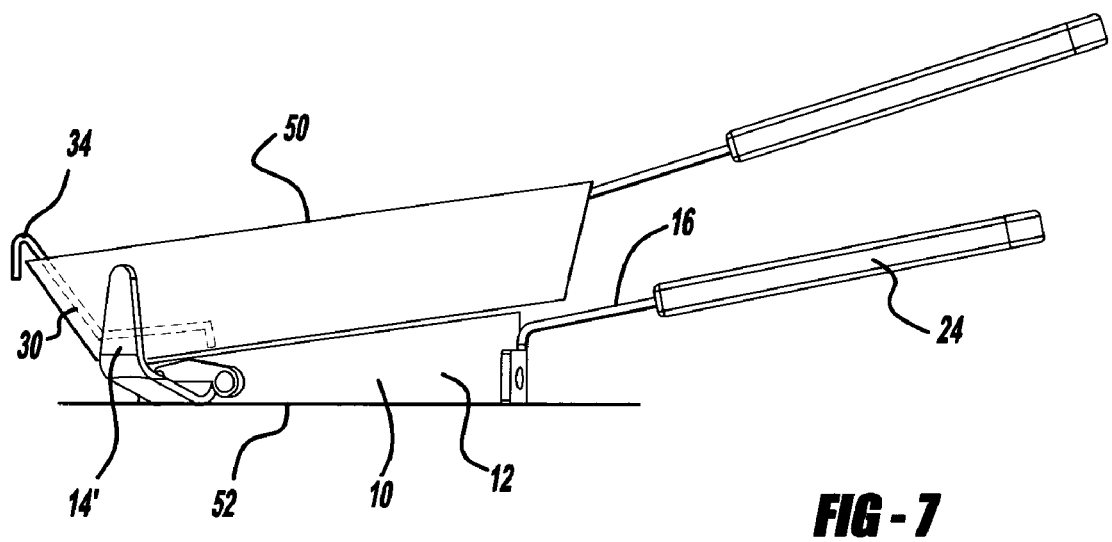
FIG. 7 is a side view of the frying pan-supporting structure combination shown in FIG. 6 but illustrating the frying pan in solid lines and the first embodiment of the shield shown in FIG. 4 in phantom lines.

Once the frying pan supporting structure 10 is placed upon a heating surface and the frying pan 50 is in place on the frying pan supporting structure 10, the shield 30 is positioned at the low end of the angled frying pan 50 such that the hook 34 is over the wall of the frying pan 50 and the lower end of the vertical wall 36 rests on the bottom of the frying pan 50. This is shown in FIG. 7 in which a side view of the frying pan 50 positioned upon the frying pan supporting structure 10 is illustrated. A heating surface 52 is shown. The heating surface 52 may be any of several configurations and may be electric or gas. The shield 30 is shown partially in broken lines. The fit of the shield 30 against the base and inner wall of the frying pan 50 is such that oil and grease can pass by the vertical wall of the shield 30 and to the low area of the angled frying pan 50. This is relatively easy to accomplish as the viscosity of cooking oil and flowing grease from meat is such that it can readily pass between the inner surface of the angled frying pan 50 and the pan-contacting edges of the shield 30.

An appropriate amount of cooking oil is placed on the base of the frying pan 50 and a foodstuff (not shown) is then placed on the high end of the angled frying pan 50. (Alternatively the cooking oil can be placed on the base of the frying pan 50 before the pan 50 is placed on the frying pan supporting structure 10. In addition, cooking oil may not be necessary depending on the interior surface of the pan 50.) The foodstuff is then cooked and excess oil and resulting grease travels from the cooking area of the frying pan 50 to the low area covered by the shield 30. As a result of using the system of the present invention the cooked foodstuff has less grease, the user and the cook-top are not spattered by hot oil and grease, and clean-up can be readily accomplished by disposal of the gathered oil and grease into a tin can or other receptacle.

Figure 8:
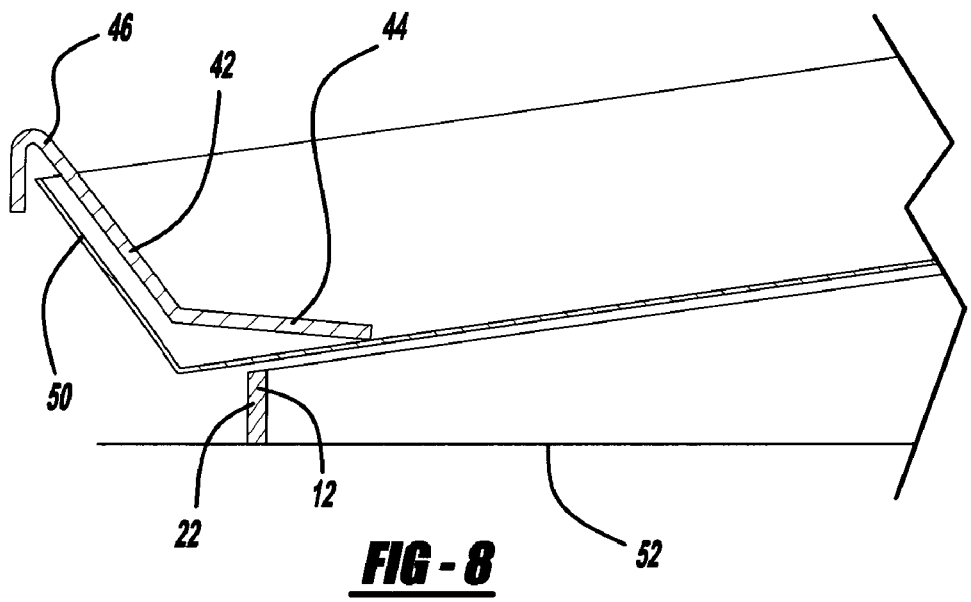
FIG. 8 is a sectional view of the frying pan-supporting structure combination of FIG. 7 but illustrating the second embodiment of the shield shown in FIG. 5 in position in the frying pan.

The second embodiment of the shield, shield 42 shown in FIG. 5, is shown in cross-section in FIG. 8. With reference to FIG. 8, the shield 42 is shown in its operating position in the frying pan 50, also shown in cross-section. This view more clearly shows how the body 44 of the shield 42 extends the working cooking surface of the frying pan 50.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for directing a liquid away from foodstuff in a frying pan, the frying pan having a base and a peripheral wall, the system including:
    a support structure in the form of a ring for supporting the frying pan, said supporting structure having a top side and a bottom side, said top side being angled relative to said bottom side, said ring having at least one frying pan-retaining arm attached thereto; and
    a shield removably positionable within said frying pan whereby said shield simultaneously contacts the base and the peripheral wall of the frying pan, said shield having a body, said body having a plurality of apertures formed therein.

2. The system of claim 1 further including a handle attached to said ring of said supporting structure.

3. The system of claim 1 wherein said body of said shield is substantially flat.

4. The system of claim 3 wherein said shield includes a hook for placement on the peripheral wall of the frying pan.

5. The system of claim 4 wherein said shield includes a wall.

6. An angled frying pan assembly for use on a substantially horizontal heating element, the assembly comprising:
    a frying pan portion having a base and a peripheral wall;
    a supporting structure in the form of a ring having a frying pan portion contacting side and a heating element contacting side, said frying pan portion contacting side and said heating element contacting side being angled relative to one another, said ring having at least one frying pan-retaining arm attached thereto; and
    a shield removably positionable within said frying pan portion whereby said shield simultaneously contacts said base and said peripheral wall of the frying pan portion, said shield having a body, said body having a plurality of apertures formed therein.

7. The system of claim 6 further including a handle attached to said ring of said supporting structure.

8. The system of claim 6 wherein said body of said shield is substantially flat.

9. The system of claim 8 wherein said shield includes a handle frying pan portion.

10. The system of claim 9 wherein said shield includes a wall.

11. A method for cooking on a heating element, the method including the steps of:
    forming an angled frying pan assembly including a frying pan portion, a supporting structure having a frying pan portion contacting side and a heating element contacting side, said frying pan portion contacting side and said heating element contacting side being angled relative to one another, and a shield;
    placing said supporting structure on the heating element;
    placing said frying pan portion on said supporting structure;
    placing said shield in said frying pan portion;
    placing foodstuff in said frying pan portion;

cooking the foodstuff in said frying pan portion; and allowing the liquid draining from the cooking foodstuff to substantially accumulate under said shield.

12. The method of claim 11 further including providing a support structure that is a ring.

13. The method of claim 12 further including a frying pan portion retaining arm on said ring.

14. The method of claim 11 wherein said shield is substantially flat.

15. A system for directing grease or oil away from foodstuff in a frying pan to a collection area, the frying pan having a base and a peripheral wall, the system including:

a support structure in the form of a ring for supporting the frying pan, said supporting structure having a top side and a bottom side, said top side being angled relative to said bottom side, said ring having at least one frying pan-retaining arm attached thereto; and a shield removably positionable within said frying pan, said shield including a body, said body covering a portion of the frying pan to cover the collection area when said shield is in contact with at least one of the base and the peripheral wall of the frying pan.

16. The system of claim 15 further including a handle attached to said ring of said supporting structure.

17. The system of claim 15 wherein said body of said shield is substantially flat.

18. The system of claim 15 wherein said shield includes a handle frying pan portion.

19. The system of claim 15 wherein said shield includes a wall.

* * * * *